July 14, 1931.    H. A. MYERS    1,814,730
SOUND INSTRUMENT
Filed March 21, 1930    2 Sheets-Sheet 1

Inventor
Hubert A. Myers
By Faust F. Crampton
Attorney

July 14, 1931.  H. A. MYERS  1,814,730
SOUND INSTRUMENT
Filed March 21, 1930  2 Sheets-Sheet 2

Inventor
Hubert A. Myers
Attorney

Patented July 14, 1931

1,814,730

UNITED STATES PATENT OFFICE

HUBERT A. MYERS, OF TOLEDO, OHIO, ASSIGNOR OF ONE-HALF TO ARTHUR S. HICKOK, OF TOLEDO, OHIO

SOUND INSTRUMENT

Application filed March 21, 1930. Serial No. 437,724.

My invention has for its object to provide a sound instrument formed of two parts, one of which is rotatable relative to the other, and wherein the two coact to produce sounds of different pitch, by rotation of one relative to the other, the rotatable member constituting the vibrant part of the instrument. The rotatable member is preferably provided with elements that cause sound of different pitch that either progressively increase the pitch, according to the diatonic scale, or in the order of sequential notes that form chords and which produce a harmonious arrangement by continual rotation of the rotatable member. The invention may be advantageously applied to instruments wherein vibration is produced by a moving current of air.

The invention may be contained in structures that partake of different forms and may be varied in their details. To illustrate a practical application of the invention, I have selected a sound instrument embodying the invention as an example of the various structures, and details thereof, that contain the invention and shall describe the selected structure hereinafter, it being understood that variations may be made without departing from the spirit of the invention. The particular structure selected is shown in the accompanying drawings.

Figure 1:
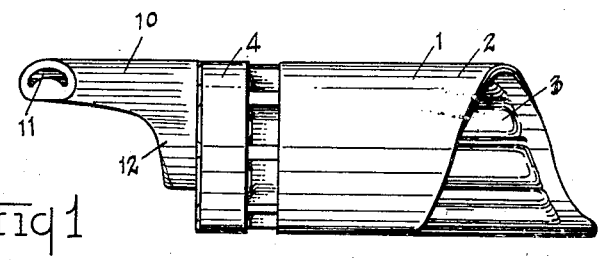
Figure 2:
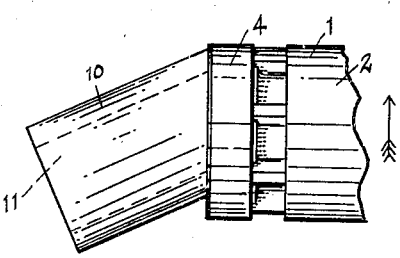
Figure 3:
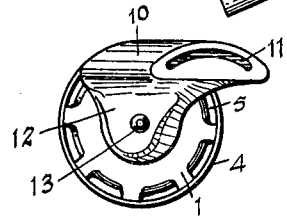
Figure 4:
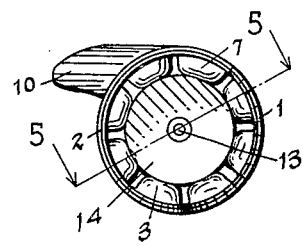
Figure 5:
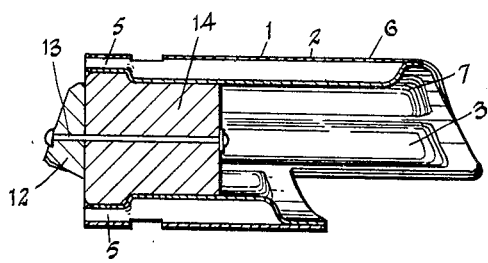
Figure 6:
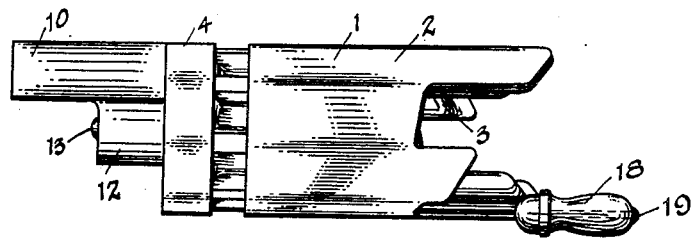
Figure 7:
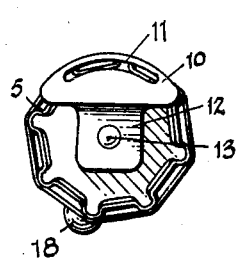
Figure 8:
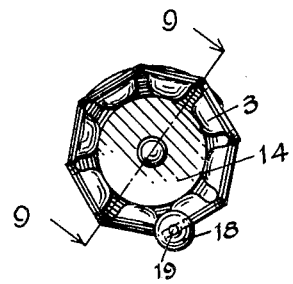
Figure 9:
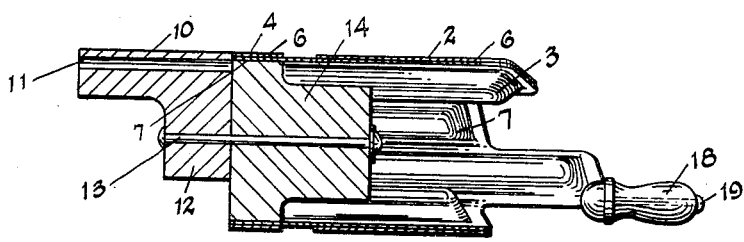

Fig. 1 is a side view of a preferred form of the structure. Fig. 2 is a top view of a part of the structure. Fig. 3 is one end view of the structure. Fig. 4 is another end view of the structure. Fig. 5 is a view of a section taken on the plane of the line 5—5 indicated in Fig. 4. Fig. 6 is a side view of a modified form of a structure embodying my invention. Fig. 7 is one end view of the structure shown in Fig. 6. Fig. 8 is the other end view of the structure. Fig. 9 is a view of a section taken on the plane of the line 9—9 indicated in Fig. 8.

Sound instruments, as shown in the drawings, are provided with a mouthpiece, or directive chamber, on which may be rotatably supported a plurality of sound elements, such as reeds, whistles, or sound pipes, that are rendered vibrant by a current of moving atmosphere, such as the breath or exhaust from some source, or an air current, directed against them through the outlet of the mouthpiece or directive chamber. Means is provided for causing the rotation of the sound producing part of the instrument in order to place each succeeding sound producing element in alignment with the outlet of the mouthpiece, or directive chamber, in succession.

In the form of construction shown, the sound producing part of the instrument may be provided with a plurality of sound pipes, reeds, or whistles. The pipes, whistles, or other sound producing means, are connected in succession by rotation with the mouthpiece. Preferably, the reeds or whistles are connected together to form an integral sound producing part of the instrument and means is provided for rotating the said part. In the particular structure shown in the Figs. 1 to 5, the sound producing part of the instrument is automatically rotated by the moving current of air which also is used for vibrating the elements as they progressively pass in line with the outlet of the mouthpiece, or directive chamber.

Thus the instrument 1 is provided with a sound producing part 2 which may be formed of a plurality of vibrant elements, such as whistles, sound pipes, or other sound producing chambers, formed to produce tones or sounds of different pitch and which are integrally connected and are arranged circularly or in substantially a cylindrical fashion. The elements 3, in the particular structure shown, are sound pipes capable of producing a diatonic scale. The vibrant air columns formed by the chambers are made to progressively produce the required difference in column length in order to effect the diatonic scale. It, however, being understood that the difference in length of the contiguous air columns is such that when the succeeding whistles or vibrant elements are sounded, they may produce a chord.

The part 2 is provided with a ring 4 having a plurality of passageways 5 that direct the moving current of air to the chambers 3 which, on entering the chamber 3, sets up a vibration of the air within the chamber. Such vibration is effected by means of a reed or by means that is produced within the chambers by vibratory pressures in the manner well known in the art. The openings 5, formed within the ring 4, are in alignment with the chambers 3 of the whistles. The ring 4, therefore, may be made a continuation of the body of the part 2 and may be an integral part of the interconnected walls that form the sound producing chambers of the instrument. The chambers and the ring may be formed of two plates 6 and 7 stamped to shape and secured at their edges and bent cylindrically to form a cylindrical or polygonal shaped series of sound producing units of the instrument.

The sound producing part 2 is connected to a mouthpiece 10. Preferably, the mouthpiece is shaped arcuate and has a passageway 11 that is oblong in form and whose surfaces are arcuate having a common axis, and its center a radius that is substantially the same as the radius of the circle in which the centers of the openings 5 are located. The mouthpiece 10 is provided with an ear 12 and the part 2 of the sound instrument is, preferably, connected to the ear at the point that the axis of the arcuate surfaces of the passageway 11 is in common with the axis of the cylindrical part 2 of the sound instrument. This connection may be made by means of a pin 13 that extends through the ear 12 and a suitable member located at the end of the rotatable part 2 of the sound instrument. For this purpose the part 2 may be provided with a block 14 located in one end of the cylindrical part 2. The pin 13 extends through the ear 12 and the block 14 to rotatably support the part 2 relative to the mouthpiece 10 so that the passageways 11 register with the passageways 5, in succession, when the sound producing part 2 of the instrument is rotated. There will thus be produced successive changes in the sound produced by the instrument or succeeding notes may be sounded by the instrument when the part 2 is rotated.

If desired, the sound producing part 2 may be automatically rotated or it may be manually rotated. In the form of construction shown in Figs. 1 to 5, the part 2 is rotated automatically by the current of air which is blown through the passageway 11, of the mouthpiece 10, in such a manner that it will strike the lateral surfaces of the passageways 5 of the ring 4, which is integral with the sound producing part 2, in a direction that is slightly inclined to the said surfaces and thus cause the part 2 to rotate in a direction that is dependent on which of the surfaces, that define each of the passageways 5, is subjected to the air pressure created by the blowing, or air, through the mouthpiece. The mouthpiece 10 may be thus located so that it is inclined to the axis of rotation of the part 2. Blowing through the mouthpiece will thus cause the part 2 to rotate in the direction of the arrow indicated in Fig. 2.

In the form of construction shown in Figs. 6 to 9, a modified arrangement of the sound chambers is shown. This arrangement may also be incorporated in the form of construction shown in Figs. 1 to 5. Also, in the form of construction shown in Figs. 6 to 9, a polygonal arrangement, in cross section, of the sound producing part 2 is shown. The sound instrument shown in Figs. 6 to 9 is also provided with a core or block 14 and a mouthpiece 10 which are pivotally interconnected by the pin 13 that extends through the ear 12 of the mouthpiece 10. The mouthpiece 10 is provided with the air passageway 11 which has surfaces that are arcuate in form, the surfaces having a common axis located in the pin 13. The rotatable part 2 is provided with a handle 16 that may be connected by means of a pin 19 that is welded or soldered to one of the more protruding portions of the rotatable member 2. The sound producing instrument may then be rotated in one direction to produce one effect, and in the opposite direction, when desired, to produce another effect. The handle being rotatably connected to the sound producing part enables the operator to easily operate the sound instrument.

I claim:

1. In a sound instrument, a mouthpiece, a plurality of air current actuated sound producing vibrant elements rotatably connected to the mouthpiece, the mouthpiece disposed at an angle to the elements for producing a lateral air pressure in the sound production of the vibrant elements to rotate the elements and produce their characteristic sound in succession.

2. In a sound instrument, a plurality of vibrant sound elements rotatably supported, and a directive member located in a fixed relation to the rotatable member for vibrating the elements and producing rotation of the vibrant elements.

In witness whereof I have hereunto signed my name to this specification.

HUBERT A. MYERS.